United States Patent
Lavoie et al.

(10) Patent No.: US 10,279,613 B2
(45) Date of Patent: May 7, 2019

(54) METHOD OF FORMING A LOTTERY TICKET WITH A TRANSLUCENT SUBSTRATE

(71) Applicant: Pollard Banknote Limited, Winnipeg (CA)

(72) Inventors: Pierre Joseph Lavoie, Winnipeg (CA); Sindy Renee Catigay, Winnipeg (CA); Kristine Susan Wattis, Winnipeg (CA); Michael John Brickwood, Winnipeg (CA); Julia Elizabeth Cloutier, Winnipeg (CA); Timothy George Edginton, Winnipeg (CA); Peter Nguyen, Winnipeg (CA); Brett Charles Taylor, Winnipeg (CA); Nancy Bettcher, Winnipeg (CA)

(73) Assignee: Pollard Banknote Limited, Winnipeg, MB (CA)

( * ) Notice: Subject to any disclaimer, the term of this patent is extended or adjusted under 35 U.S.C. 154(b) by 16 days.

(21) Appl. No.: 15/357,506

(22) Filed: Nov. 21, 2016

(65) Prior Publication Data

US 2017/0157967 A1     Jun. 8, 2017

Related U.S. Application Data

(63) Continuation-in-part of application No. 14/718,666, filed on May 21, 2015, now abandoned.

(51) Int. Cl.
*B42D 25/351* (2014.01)
*B41M 3/00* (2006.01)
*G07F 17/32* (2006.01)
*G07F 17/42* (2006.01)
*A63F 3/06* (2006.01)

(52) U.S. Cl.
CPC ............ *B41M 3/008* (2013.01); *A63F 3/0665* (2013.01); *B42D 25/351* (2014.10); *G07F 17/329* (2013.01); *G07F 17/42* (2013.01)

(58) Field of Classification Search
CPC ............... B42D 25/351; Y10S 283/901; Y10S 283/903
USPC ........................................ 283/901, 903, 98
See application file for complete search history.

(56) References Cited

U.S. PATENT DOCUMENTS

| | | |
|---|---|---|
| 5,114,735 A | 5/1992 | Rua |
| 5,228,692 A | 7/1993 | Carrick |
| 5,451,052 A | 9/1995 | Behm et al. |

(Continued)

FOREIGN PATENT DOCUMENTS

| | | |
|---|---|---|
| EP | 0115903 | 8/1984 |
| EP | 0568814 | 11/1993 |

(Continued)

*Primary Examiner* — Kyle R Grabowski
(74) *Attorney, Agent, or Firm* — Adrian D. Battison; Ade & Company Inc.; Ryan W. Dupuis

(57) ABSTRACT

A lottery ticket is printed on a substrate sheet material having a front surface with lottery game indicia printed thereon and a removable covering material, typically scratch-off material, covering the lottery game indicia which is removable by a player to expose the game indicia for playing the game and other game information printed on the substrate sheet material where at least part of the substrate sheet material is formed of a translucent synthetic material to enable viewing through the part by the player.

16 Claims, 5 Drawing Sheets

(56) References Cited

U.S. PATENT DOCUMENTS

| | | | |
|---|---|---|---|
| 6,076,860 A | 6/2000 | Holman | |
| 6,588,747 B1 | 7/2003 | Seelig | |
| 2004/0023711 A1 | 2/2004 | Knapp | |
| 2007/0246933 A1 | 10/2007 | Heim | |
| 2009/0166968 A1 | 7/2009 | Stephens | |
| 2010/0253062 A1* | 10/2010 | Hardwick | B42D 25/351 283/110 |
| 2012/0025516 A1* | 2/2012 | Miller | B42D 25/351 283/100 |
| 2013/0196120 A1* | 8/2013 | Gray | C09J 7/29 428/174 |

FOREIGN PATENT DOCUMENTS

| | | | |
|---|---|---|---|
| GB | 2352422 | 1/2001 | |
| JP | 2002211178 | 7/2002 | |
| JP | 2002211178 A * | 7/2002 | B42D 25/351 |
| WO | WO2012022463 | 2/2012 | |
| WO | WO-2012022463 A1 * | 2/2012 | G07D 7/0006 |

* cited by examiner

METHOD OF FORMING A LOTTERY TICKET WITH A TRANSLUCENT SUBSTRATE

This application is a continuation in part of application Ser. No. 14/718,666 filed May 21 2015 which is pending.

This invention relates to method of forming a lottery ticket where at least a part of the substrate carrying the lottery ticket information comprises a polymer film and particularly relates to scratch-off lottery tickets and the use of synthetic substrate material.

This invention further relates to a lottery ticket where at least a part of the substrate carrying the lottery ticket information is translucent or transparent.

Also disclosed is a method of playing a lottery ticket game where at a second ticket when viewed through a translucent part of a first ticket is arranged so that a characteristic of the translucent part exposes data on the second ticket which is not visible when viewed without the translucent part.

BACKGROUND OF THE INVENTION

Lottery tickets are well known and widely sold and typically comprise a sheet material of paper or card stock on which is printed lottery information and various indicia for the playing of one or more games. Many such games are instant win type games where the player can play the game or games by carrying out various functions. These include a first type of ticket which involves removing a scratch-off layer for scratch-off tickets. A second type of ticket involves opening pull tabs windows for what are known as break-open tickets. Such tickets are also known variously as pull-tabs, pickle cards, jar tickets, hard cards and charitable gaming tickets. Typically, these two distinct types of lottery tickets are targeted to different markets.

The break-open ticket is typically manufactured in a process which involves firstly printing using a printing press a full sheet which thus defines a set of the tickets in rows and columns which is laminated to a similar sheet of top sheet portions. The laminated sheets then must be cut in a mechanical cutting station into the individual ticket portions. The tickets thus formed are limited to the symbol combinations printed in the set. This leads generally to a reduced level of security for break-opens generally thus limiting the prize value which can be provided.

The present invention relates to both scratch-off and break-open tickets but is primarily concerned with scratch-off tickets where the substrate must also provide the necessary security characteristics such as opacity.

Scratch-off lottery tickets have up to date been printed on cardstock or foil laminated substrates for decades. Such substrates are typically relatively stiff and dimensionally stable to allow printing and to provide a finished product which remains generally flat when used by the player. This flat stiff structure enables the player to easily hold the ticket and hold the game area flat as the scratching process is applied.

Also the substrate used to date is opaque. It will be appreciated that the area containing the game data must be sufficiently opaque that it cannot be compromised by a strong light shone through the substrate and the game data. The degree of opacity to obtain this feature is typically assisted by printed layers of opaque material including a backing layer under the game data and the scratch-off material itself. Foil substrates are sufficiently opaque so that no additional layers are required although typically a white layer is applied beneath the game data to provide a higher contrast level between game indicia and the background. Card stock requires additional layers to provide the opacity required. However in all cases the substrate used has itself an initial high opacity level and other less opaque materials have thus been considered unsuitable.

Also the substrate must pass thought the printing process and allow the printing to be registered with a particular location on the substrate. Thus again foil substrates have a very high dimensional stability and hence are particularly desirable. Card stock has less dimensional stability and may stretch slightly but in a manner which can be managed in the printing process. Other less stable materials have thus been considered unsuitable.

As the substrate used to date therefore is either laminate stock including but not limited to foil laminates, transfer film laminates, etc. or card stock including various stock weights such as text weight and cover weight, aesthetic variation are limited to combinations of graphics, inks and coatings. In the continuing challenge to capture the attention of consumers in the cluttered retail environment, fast moving consumer packaged goods, including lottery tickets, rely on fresh new packaging options.

SUMMARY OF THE INVENTION

It is one object of the invention to provide a method for forming a ticket using a substrate which is of a translucent plastics material with the intention that novel features can be provided to the player using the characteristics of the substrate.

According to the invention there is provided a method of constructing a lottery ticket comprising:

forwarding a substrate sheet material comprises a synthetic plastics or polymer material;

printing onto a front surface of said substrate material an opaque non-removable lilypad;

printing onto the front surface and on top of the opaque lilypad a white lilypad;

printing onto the front surface and onto the white lilypad using variable image printing an ink material arranged to display lottery game indicia;

printing onto the front surface and covering the lottery game indicia with one or more clear protective layers;

printing onto the front surface of the clear protective layer an opaque material covering the lottery game indicia which is removable by a player to expose the game indicia for playing the game;

wherein the substrate is arranged to have the following characteristics

| | |
|---|---|
| Melting Point | ≥150 C. ° |
| Softening Point | ≥110 C. ° |
| Shrinkage | ≤3% (30 min at 150 C. °) |
| Surface Energy | ≥39 Dyne/cm |
| Optical Transmission | ≥80% (400 to 700 nm) |
| Tensile Strength | ≥20 Kg/mm$^2$ |
| Tear Strength | ≥20 g/Mil |
| Caliper | 25-500 micron | wherein there is printed onto the front surface of said substrate material underneath the opaque non-removable lilypad an adhesive promoting layer of a litho ink in a thickness in the range 0.5 to 2 microns which is cured to provide bonding to the substrate;

and arranging one or more layers of the ticket to prevent observation by an intruder of any ink material from the lottery game data which has migrated from above the white lilypad to the substrate.

A number of techniques can be used to prevent observation by an intruder of any ink material from the lottery game data which has migrated from above the white lilypad to the substrate is prevented which can be used independently or in combination as follows:

—a— applying a confusion pattern in different colors to a location between the adhesive promoting layer and the white lilypad.

—b— printing onto a rear surface of the substrate a litho ink in a thickness in the range 0.5 to 2 microns which is arranged to absorb or reflect any electromagnetic energy applied thereto.

—c— using an ink selected to prevent migration of any component thereof from the lottery game data above the white lilypad to the substrate.

—d— applying ultraviolet or electron beam irradiation to the rear surface of the substrate.

—e— using a substrate that comprises two films with differing refractive index values which refracts electromagnetic energy so the game data is not visible In one arrangement, the substrate is arranged to have the characteristic of a surface energy greater than 39 Dyne/cm by applying to the substrate an acrylic emulsion where the acrylic emulsion is applied preferably to both front and rear surfaces of the substrate.

In another arrangement the substrate is arranged to have the characteristic of a surface energy greater than 39 Dyne/cm by treating the front and rear surfaces of the substrate with a plasma treatment.

Preferably the substrate is PET, but other materials defined herein can be used.

For effective use as a lottery ticket, preferably the substrate has a fold endurance of ≥103 cycles.

Preferably the litho ink is cured by ultraviolet or electron beam radiation energy but other types of curing processes can be used.

Typically the layers are applied to a portion only of the substrate leaving at least one other part which is translucent for use in the operation of the ticket as described hereinafter.

In some cases the substrate is colored.

In some cases the whole of the ticket is formed by said substrate so that the game indicia and the covering is printed on the said substrate but other embodiments can be provided where a part only of the substrate is formed by said material.

In some cases the synthetic plastics material is laminated to another material and a part of the other material is omitted or removed to expose the synthetic plastics material for example in the form of a window in the ticket.

According to another definition of the invention there is provided a method of constructing a lottery ticket comprising:

forwarding a substrate sheet material comprises a synthetic plastics or polymer material;

printing onto a front surface of said substrate material an opaque non-removable lilypad;

printing onto the front surface and on top of the opaque lilypad a white lilypad;

printing onto the front surface and onto of the white lilypad using variable image printing an ink material arranged to display lottery game indicia;

printing onto the front surface and covering the lottery game indicia with one or more clear protective layers;

printing onto the front surface of the clear protective layer an opaque material covering the lottery game indicia which is removable by a player to expose the game indicia for playing the game;

wherein the substrate is arranged to have the following characteristics

| | |
|---|---|
| Melting Point | ≥150 C. ° |
| Softening Point | ≥110 C. ° |
| Shrinkage | ≤3% (30 min at 150 C. °) |
| Surface Energy | ≥39 Dyne/cm |
| Optical Transmission | ≥80% (400 to 700 nm) |
| Tensile Strength | ≥20 Kg/mm$^2$ |
| Tear Strength | ≥20 g/Mil |
| Caliper | 25-500 micron | wherein there is printed onto the front surface of said substrate material underneath the opaque non-removable lilypad an adhesive promoting layer of a litho ink in a thickness in the range 0.5 to 2 microns which is cured to provide bonding to the substrate;

wherein the substrate is arranged to have the characteristic of a surface energy greater than 39 Dyne/cm by applying to both the front and rear surfaces of the substrate an acrylic emulsion;

and preventing observation by an intruder of any ink material from the lottery game data which has migrated from above the white lilypad to the substrate by applying a confusion pattern in different colors to a location between the adhesive promoting layer and the white lilypad and by printing onto a rear surface of the substrate a litho ink in a thickness in the range 0.5 to 2 microns which is arranged to absorb or reflect any electromagnetic energy applied thereto.

The method described above may be used to form a lottery ticket comprising:

a substrate sheet material having a front surface having lottery game indicia printed thereon;

a removable covering material covering the lottery game indicia which is removable by a player to expose the game indicia for playing the game;

game information printed on the substrate sheet material;

wherein at least part of the substrate sheet material comprises a polymer material.

Preferably the synthetic plastics material is translucent to enable viewing through said at least a part by the player.

The method described above may be used to form a lottery ticket comprising:

a substrate sheet material having a front surface having lottery game indicia printed thereon;

a removable covering material covering the lottery game indicia which is removable by a player to expose the game indicia for playing the game;

game information printed on the substrate sheet material;

wherein at least part of the substrate sheet material is translucent to enable viewing through said at least a part by the player.

Preferably the translucent material is arranged to have a character to change the appearance of an underlying object viewed through the translucent material. That is the material can be the colored or polarized or may have other characteristics which affect what is viewed underneath.

The ticket may also include the use of refractive synthetic material to provide a holographic appearance to all or a portion of the ticket.

The whole of the substrate can be formed by said material so that the game indicia and the covering is printed on the said material or a part only of the substrate is formed by said material.

Preferably the synthetic plastics material is laminated to another material and a part of the other material is omitted or removed to expose the synthetic plastics material.

For example the part removed may form a window in the ticket or a band across the ticket or any other shape within the main body of the ticket.

Preferably a part only of the substrate is formed by said material and another part is formed of a card or foil stock and the game indicia and the scratch-off or break-open covering is applied onto the other part.

Preferably the ticket is formed so that it has a dimensional stability and will be of similar caliper and stiffness so the ticket is relatively uniform Preferably the translucent/plastics material is selected so that it has an opacity or can be made opaque with the use of opacifying chemistry to hide gaming indicia Preferably the translucent/plastics material is selected so that it has an array of thickness to satisfy the end user's needs.

The translucent/plastics material can be of single material construction or made of multi-layers so that characteristics such as stiffness, dimensional stability and acceptance of printing can be selected and tailored to form a composite material.

The method described above may be used in a method of playing a lottery ticket game comprising:

providing a first and a second lottery ticket wherein each ticket comprises:
  a substrate sheet material having a front surface having lottery game indicia printed thereon;
  a removable covering material covering the lottery game indicia which is removable by a player to expose the game indicia for playing the game;
  game information printed on the substrate sheet material;
  wherein at least part of the substrate sheet material is translucent to enable viewing through said at least a part by the player;
  and viewing the second ticket through a translucent part of the first ticket;
  wherein the translucent part is arranged so that a characteristic of the translucent part of the first ticket combines with a characteristic of the viewed part of the second ticket.

As used herein, the surface with the game data on is termed as the front surface but this could be either the surface of a single substrate or on any one or more of the surfaces of a multi-layer ticket such as a folded or multi-page ticket.

For example the characteristic of the translucent part of the first ticket combines with the characteristic of the viewed part of the second ticket to expose data on the second ticket which is not visible when viewed without the translucent part.

Alternatively the characteristic of the translucent part of the first ticket combines with the characteristic of the viewed part of the second ticket to allow data on the second ticket to be combined with data on the first ticket.

As yet further alternatives, the characteristic of the translucent part of the first ticket combines with the characteristic of the viewed part of the second ticket to allow graphic or other elements of the second ticket to be combined with graphic or other elements of the first ticket to create new aesthetic effects or messages.

As yet further alternatives, the characteristic of the translucent part of the first ticket combines with the characteristic of the viewed part of another printed item such as a photograph or digital image to create new aesthetic effects or messages.

As yet further alternatives, the translucent portion(s) are covered in whole or in part with scratch-off layers or a tab so that the translucent portion is not usable or only partially visible until the ticket is purchased and played.

As yet further alternatives, multiple translucent films could be combined in a movable format such that they reveal or enhance part of the ticket experience when rotated or repositioned over each other.

As yet further alternatives, the translucent film combines with an encapsulated compound whereby applying the film to the ticket surface and rubbing the film causes the capsules to release a compound that would react with an invisible dye to make it visible.

As yet further alternatives, the translucent film can be folded over onto the same ticket to enhance another printed graphic element or the game play experience.

The term "translucent" as used herein includes materials where light can pass through the substrate so that this may include materials which are transparent where no light scattering occurs.

As described herein there is provided a substrate, comprising synthetic substrate(s) or a combination of synthetic substrate(s) with card stock and/or other types of opaque scratch-off lottery ticket substrate(s), to produce a distinctive looking lottery ticket. The new substrate, whether it is synthetic or a combination of synthetic and conventional scratch-off ticket substrate(s) will satisfy the physical security requirements commonly provided by conventional ticket substrates for scratch-off lottery tickets.

The synthetic substrate can be transparent, semi-opaque, colored and/or patterned. The scratch-off tickets feature an underlying layer or layers beneath the game data, which will provide the opacity requirements to prevent transmitted light compromise or other methods of compromise used with the application of various frequencies of lighting, filters and image capture and a layer or layers which will provide the contrast level between the background and game data to provide good legibility. In addition this combination of layers will also provide the adhesion characteristics necessary to bond the data to the synthetic substrate and compatibility with overlying security coatings designed to secure the variable data elements and provided the release characteristics required for scratch-off removal by player. Similarly portions of the synthetic substrate may be coated with underlying layer or layers to improve graphic appearance and durability of the graphic images. The synthetic substrate provides enhanced chemical resistance to compromise attempts from the back of the tickets compared to cardstock tickets.

Typical polymeric materials (sometimes known as plastics or synthetic materials) include as examples:
  Polyester (PES).
  Polyethylene terephthalate (PET).
  Polyethylene (PE).
  High-density polyethylene (HDPE).
  Polyvinyl chloride (PVC).
  Polyvinylidene chloride (PVDC).
  Low-density polyethylene (LDPE).
  Polypropylene (PP).
  Polystyrene (PS).
  Polycarbonate (PC).
  Polymethyl methacrylate (PMMA) (Acrylic).
  Polytetrafluoroethylene (PTFE).
  Poly lactic acid (PLA)
  Bioplastics
  Biobased polymers
  Recycled plastics The material may be formed from one or more layers of these materials to provide the required characteristics defined herein.

For hybrid ticket combining the synthetic and conventional ticket substrates, the synthetic substrate may be printed with artistic images and/or game-related information or data and the card stock or other conventional ticket substrate contains the security layers, game indicia and scratch-off material. The synthetic and conventional ticket substrate(s) are laminated together such that the appearance and transparent or partially transparent quality of the synthetic printed portion is preserved in part or in its entirety, and the opaque, conventional stock portion(s) provides physical ticket security qualities in keeping with conventional scratch-off lottery tickets.

The tickets can be supplied in the form of continuous, fanfolded books with perforations separating the individual tickets. They can however also be provided as single tickets or sheets of tickets or rolls of tickets.

In the preferred embodiments, the new substrate enables interactivity between two or more tickets by overlaying the tickets and reading data, information or graphics printed on one ticket in combination with data, information or graphics printed on another ticket to form a new combination of data, information or graphics. Other embodiments are also possible, including but not limited to the use of the synthetic substrate as a decoder. In this embodiment, the synthetic substrate could be semi-opaque, tinted or patterned, and when over-laid on top of another ticket, could serve to decode hidden or scrambled information that may be related to the game play. The synthetic substrate provides a unique appearance for graphics and, optionally, game elements, and the ability to overlay one ticket on another to form a new graphic effect or new combination of information, potentially transforming a non-winning ticket into a winner.

The unique appearance of the synthetic ticket can catch attention at retail which drives sales for impulse products like lottery tickets. The unique tactile quality and optional ability to combine multiple tickets for an added entertainment or additional chances to win will create a higher perceived value for consumers, resulting in higher satisfaction and additional sales.

The tactile quality is obtained by selecting the characteristics so that the substrate is smooth and slick, giving the ticket a rich, high quality feel that is distinct from conventional scratch-off ticket substrates. It may also be textured or molded to add variety to the tactile sensation.

In one example the characteristic of the translucent part of the first ticket combines with the characteristic of the viewed part of the second ticket to enhance other images, create new graphic effects or decode hidden messages.

In one example the translucent material is patterned to enhance other images or create new visual effects or decode hidden messages.

The film preferably has the following characteristics:
Caliper=25 micron to 500 micron
Printable on one or both side of the substrate using lithography, flexography, gravure, screen and digital printing
Substrate service temperature: −70 C to 200 C
Specific gravity of the film(s): 1.0 to 1.5 g/cm3
Surface energy level of 30 to 60 dyne
Water and oil resistant as it pertains to security lab testing
Acid and alkali resistant as it pertains to security lab testing

DETAILED DESCRIPTION

Figure 1:
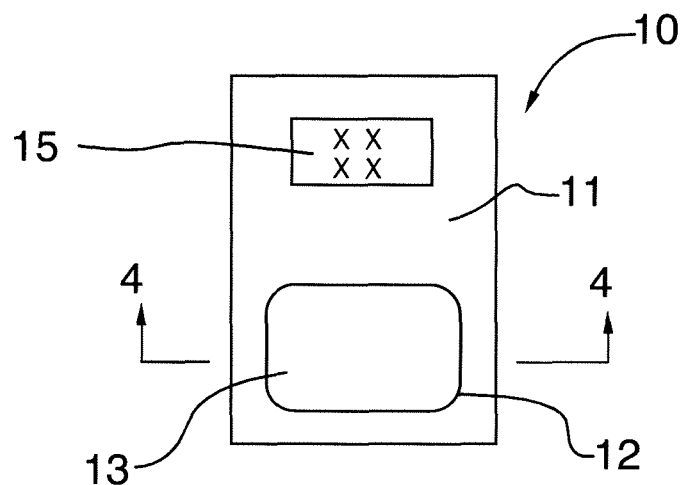
FIG. 1 is a plan view of a first ticket according to the invention where the ticket substrate is formed from a plastics or synthetic material with the game data and removable covering printed on the substrate.
Figure 2:
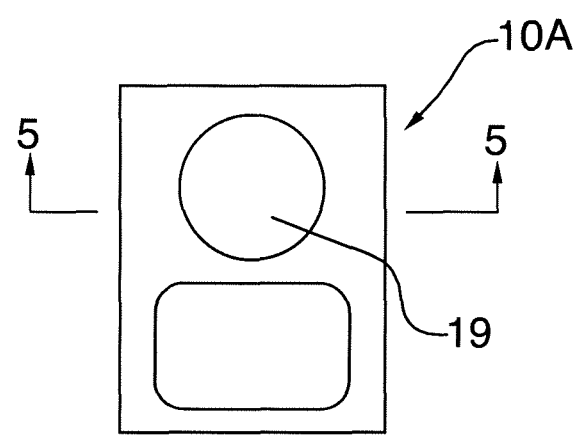
FIG. 2 is a plan view of a second ticket according to the invention where the ticket substrate is formed mainly from a conventional card stock which is laminated to a window area formed from a plastics or synthetic material with the game data and removable covering printed on the card stock.
Figure 3:
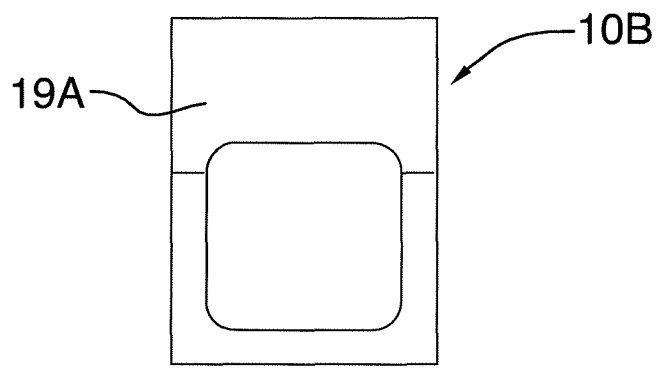
FIG. 3 is a plan view of a third ticket according to the invention where the ticket substrate is formed mainly from a conventional card stock which is laminated to a window area formed from a plastics or synthetic material with the game data and removable covering printed on the card stock.
Figure 4:
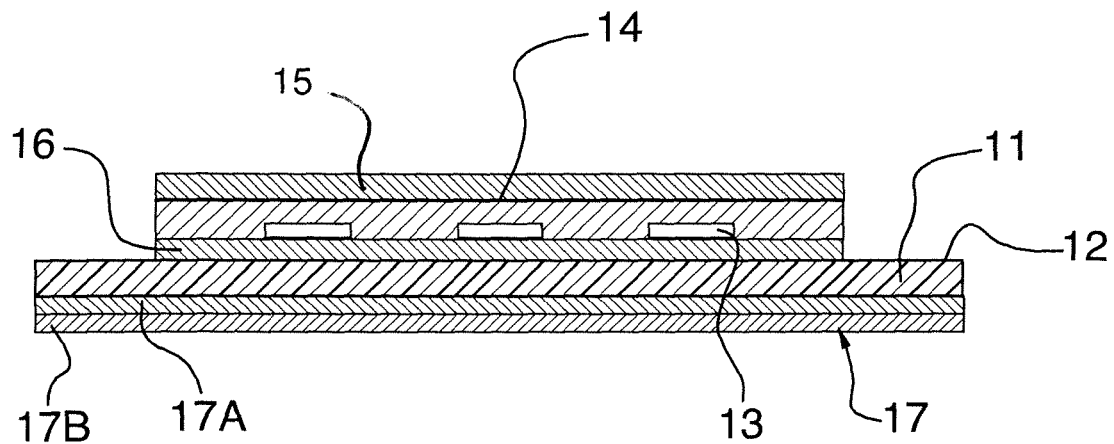
FIG. 4 is a cross-sectional view along the lines 4-4 of FIG. 1.

As shown in FIGS. 1, 2 and 3, there is provided a lottery ticket 10, 10A, 10B each of which includes a substrate sheet material 11 having a front surface 12 having lottery game indicia 13 printed thereon. A removable covering material 14 covers the lottery game indicia 13 which is removable by a player to expose the game indicia for playing the game. The front surface includes game information 15 printed on the substrate sheet material 11.

In each of the figures the removable covering comprises a scratch-off coating 14 typically printed over a release coating or varnish layer 16C. The game data is printed onto a security layer 16 which includes one or more pigmented layers to form an opacity to prevent transmission of light and which typically includes a white lily pad to provide a base to render the game data 13 more visible.

In another arrangement, the game data can be printed on one synthetic substrate and then laminated another synthetic substrate over top to protect the data.

In the present invention, at least part of the substrate sheet material comprises a synthetic plastics material 17. The plastics material can be formed of different layers 17A, 17B to provide the required characteristics as described herein.

As shown in FIG. 1, the whole of the substrate is formed by the plastics material so that the game indicia 13 and the covering 14 is printed on the material.

As shown in FIGS. 2 and 3, a part only of the substrate is formed by the material.

Figure 5:
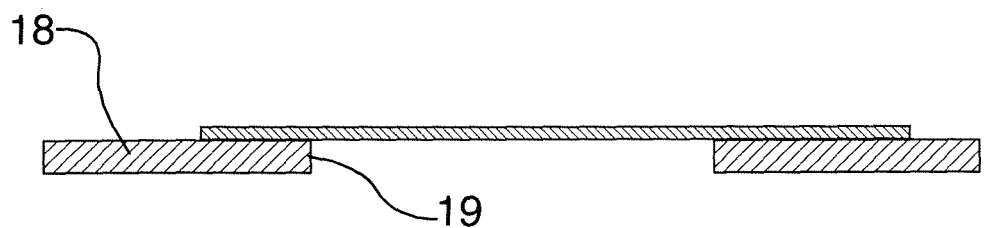
FIG. 5 is a cross-sectional view along the lines 5-5 of FIG. 2.
Figure 6:
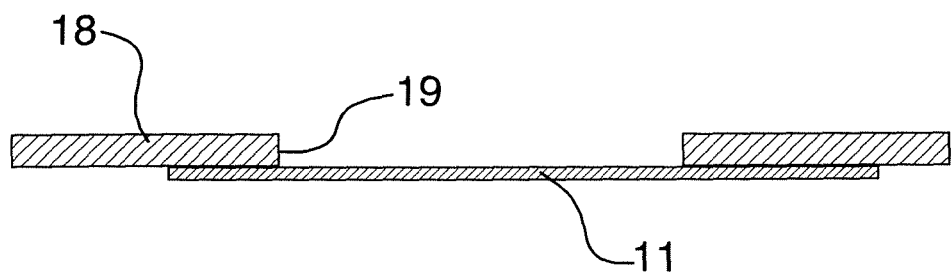
FIG. 6 is an alternative cross-sectional view along the lines 5-5 of FIG. 2.

As shown in FIGS. 5 and 6 synthetic plastics material 11 is laminated to another material 18 such as the card stock and a part of the other material is omitted or removed at an opening 19 to expose the synthetic plastics material 11. In FIG. 5 the part removed forms a window in the ticket. In FIG. 3 the part removed forms a band 19A across the ticket.

Figure 7:
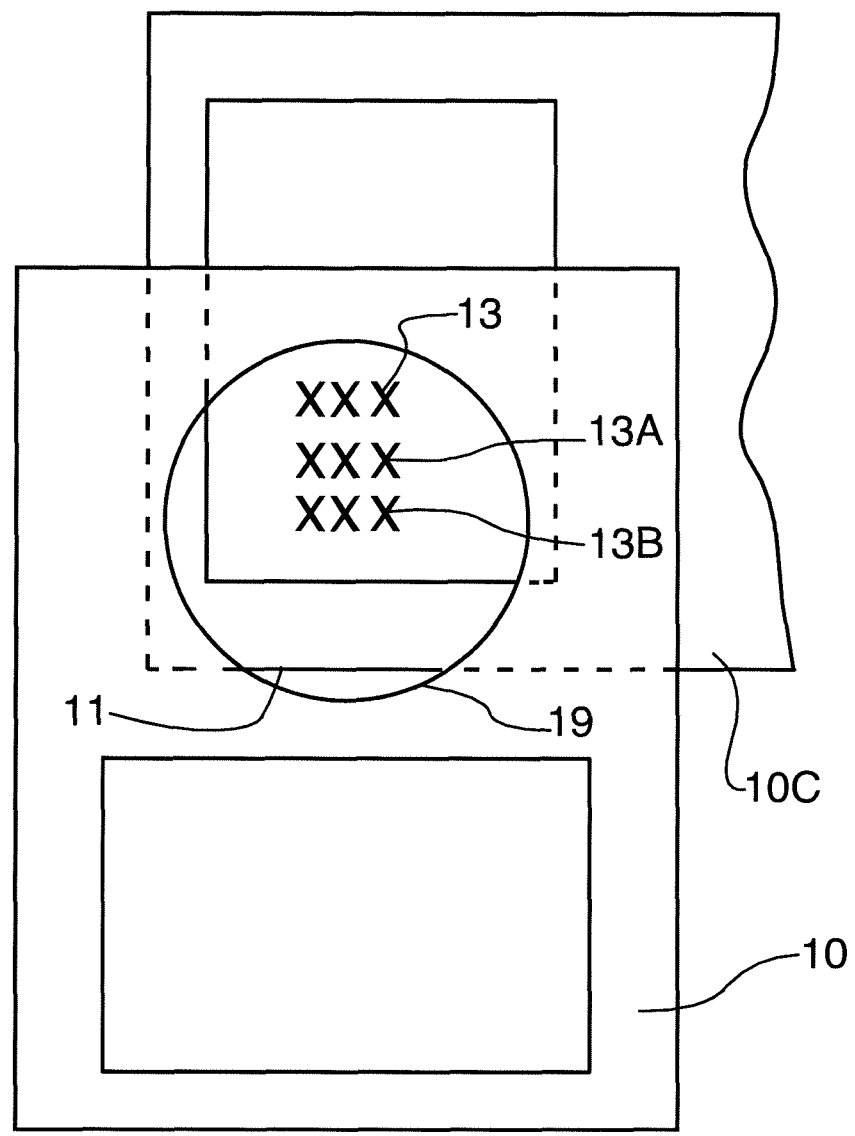
FIG. 7 is a plan view of a first and second ticket according to the invention where the game data or other elements of the second ticket are viewed through the translucent window of the first ticket to reveal game data or other elements not otherwise visible.

As shown in FIG. 7 the synthetic plastics material 11 in the window 19 is translucent to enable viewing by the player through the part of the substrate which is formed by the material. As shown a second ticket 10C is viewed through the window and the translucent material is arranged to have a character to change the appearance of an underlying object in this case the game data 13 viewed through the translucent material. That is additional data 13A may become or be made visible by the effect of the change made by the translucent material. Typically the translucent material is simply colored which then cooperates with colors on the game data to make the game data more or less visible.

However other characteristics in the material can be used such as the translucent material is polarized. Alternatively, the translucent material could be patterned to enhance other images or create new visual effects or decode hidden messages.

Where a part only of the substrate is formed by the plastics material and another part is formed of a card or foil stock and the game indicia and the covering is typically but not necessarily applied onto the other part as shown in FIG. 2 or 3.

In the method of playing a lottery ticket game shown in FIG. 7 using two of the tickets shown in FIG. 2 the player views the second ticket through the translucent part of the first ticket and the translucent part is arranged so that a characteristic of the translucent part of the first ticket combines with a characteristic of the viewed part of the second ticket to expose data on the second ticket which is not visible when viewed without the translucent part or acts to allow data on the second ticket to be combined with data on the first ticket where the data by placing one set of data 13B on the translucent material of the first ticket at or adjacent the data 13 on the underlying second ticket.

Figure 4A:
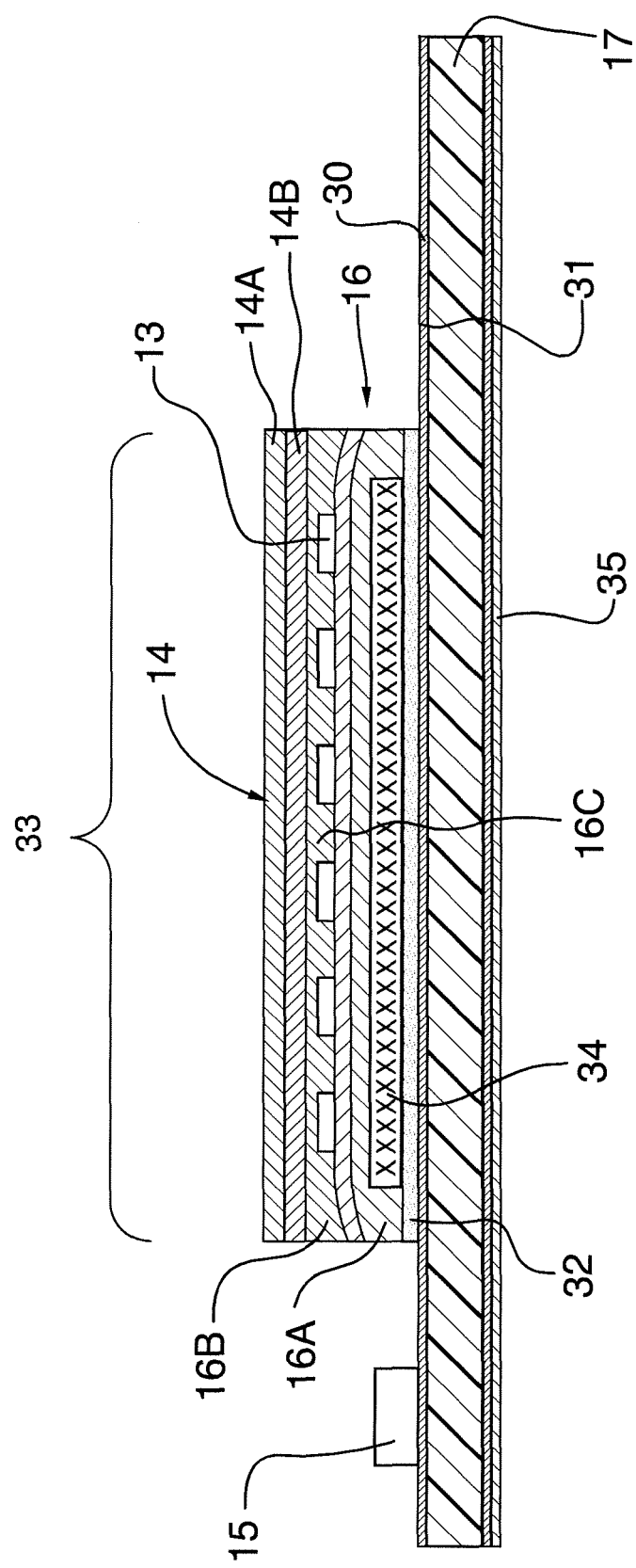
FIG. 4A is a cross-sectional view along the lines 4-4 of FIG. 1 showing a modified ticket with additional security components.
Figure 8:
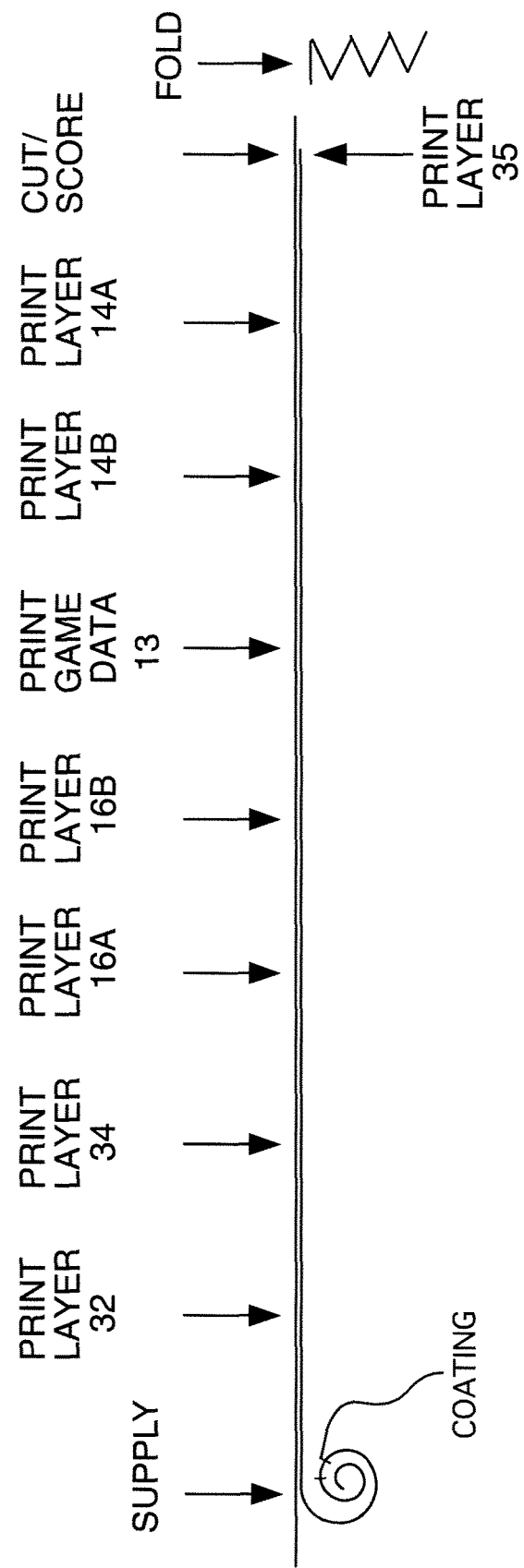
FIG. 8 is a schematic illustration of the method of manufacture of the ticket.

In the method of constructing a lottery ticket the following steps are followed as shown in FIGS. 4A and 8.

A substrate sheet material comprising a synthetic plastics or polymer material is forwarded from a supply. The substrate is coated on both sides by an acrylic emulsion layer 30, 31 which provides for the substrate the characteristic of a surface energy greater than 39 Dyne/cm. The emulsion is typically applied in a conventional coating process during manufacturing so that the substrate is supplied in the coated form.

Onto a front surface of the substrate material over the emulsion 30 only in the game area 33 is printed an adhesive promoting layer 32 of a litho ink in a thickness in the range 0.5 to 2 microns. The layer 32 is then cured by ultraviolet or electron beam radiation energy to provide bonding to the substrate. This may occur through cross-linking between the substrate and the layer 32 or other bonding action may occur.

The confusion pattern may be a random selection of ascii characters or a pattern of randomly placed shapes likes squares for example.

Onto a front surface of the substrate material over the layer 32 in the game area 33 is printed an opaque non-removable lilypad 16A followed by a white lilypad 16B A confusion pattern 34 in two to four different colors is printed onto the substrate in the game area only at a location between the adhesive promoting layer 32 and the lilypad 16A.

Onto the white lilypad using variable image printing is printed an ink material arranged to display lottery game indicia 13 and this is covered and protected by one or more clear protective covering layers 16C typically of a clear varnish.

Onto the front surface of the clear protective layer is printed an opaque material in one or more different layers 14A, 14B covering the lottery game indicia which is removable by the player by scratching so that the material fragments and breaks away to expose the game indicia for playing the game.

Onto a rear surface of the substrate is printed onto the emulsion 31 a litho ink layer 35 in a thickness in the range 0.5 to 2 microns which is arranged to absorb or reflect any electromagnetic energy applied thereto.

In order to ensure proper printing of the required layers on the ticket and to ensure security of the game data against typical attacks, the ticket as printed has characteristics as set out hereinafter.

| Property of Substrate | Value Range |
| --- | --- |
| Melting Point | 150-290 C. ° |
| Softening Point | 110-260 C. ° |
| Shrinkage | 0-3% (30 min at 150 C. °) |
| Surface Energy | 39-50 Dyne/cm |
| Optical Transmission | ≥80% (400 to 700 nm) |
| Tensile Strength | M.D. ≥20 Kg/mm$^2$ |
|  | C.D. ≥ 20 Kg/mm$^2$ |
| Tear Strength | ≥20 g/Mil |
| Fold Endurance | ≥103 Cycles |
| Caliper | 25-500 micron |

It is necessary therefore to ensure that the ticket printed on the translucent substrate is secure against convention attack methods known in the industry.

Selection of the synthetic plastic used to print lottery tickets plays a role in the build of a secure lottery ticket. Consideration needs to be given to the physical properties of the substrate such as film lamination combination, orientation, refractive index, melting point, softening point, tensile strength, tear strength and electrical properties as an example. This needs to be taken into account with respect to the printing equipment being used for producing said ticket. It also needs to be taken into account for the security and performance of the ticket/game.

The substrate selected is PET so that it can stand up to the printing process. The PET can be heated and not reach its melting point while running through gas fired forced air dryers and IR dryers while drying the inks and coatings applied to make the substrate functional and secure. PET provides a softening point selected so that the substrate minimizes the distortion under tension through the printing process. The PET substrate due to the strength properties performs as expected as a scratch lottery ticket and the demands from the market place. The ticket must meet standards to be used for example in distribution methods like vending machines and ticket dispensers.

The foundation ink film(s) needs to provide adhesion to the substrate. One consideration is the surface energy of the synthetic substrate and how to increase surface energy to promote adhesion of coatings and inks. Consideration must also be given to the selection of the chemistry used to promote bonding to the type of synthetic substrate being printed, or the use of plasma treatment to obtain the correct surface energy for the film of choice.

In order to print on the PET the material is treated with an acrylic emulsion applied to promote adhesion of printing inks. The material can be used without the coating applied but the process needs to treat the film with a plasma treatment to increase the surface energy.

The initial base layer 21 printed on the treated film is printed as a thin film to promote adhesion with a chemistry which is energy curable.

Once the base foundation chemistry and coating is identified then one or more opaque coatings are printed to protect the game data from various forms of surreptitious readout, The confusion pattern made of one or multiple colours is used to deter or reduce the ability to read game data or visualise components of the game data ink by use of electromagnetic energy. A coating or ink is also applied to the opposite side of the lottery ticket to reflect or absorb electromagnetic energy to secure the lottery ticket from readout of gaming data.

As an alternative or as an additional measure, a coating may be chosen to prevent the migration of the components of the imaging ink to the base i.e. clear substrate.

Irradiation can be applied to the non-game side of the game piece to reduce the migration. That is a solution or at least a potential solution to mitigate or eliminate the migration that is being seen on the ticket back using the current production method.

Refractive index of the synthetic substrate and possible lamination combinations to improve the security of the game data via surreptitious readout. This is a possible solution the migration issue by using a substrate that comprises two films with differing refractive index values which refracts the electromagnetic energy so the game data is not visible.

Imaging ink chemistry needs to be considered in the ticket formulation as it critical to the overall security of the ticket. The use of a pigmented imaging ink versus a dye based imaging ink or an energy curable ink needs to be taken into account to achieve ticket security. Imaging ink component migration is a key consideration. Pigmented and energy curable inks are better due to the cleaner chemistry and components that make up the ink.

The invention claimed is:

1. A method of playing a lottery game comprising:
constructing a lottery ticket by the steps comprising:
forwarding a substrate sheet material which comprises a translucent polymer material;
printing onto a front surface of said substrate material an opaque non-removable lilypad;
printing onto the front surface and on top of the opaque lilypad a white lilypad;
printing onto the front surface and onto the white lilypad using variable image printing an ink material arranged to display lottery game indicia;
printing onto the front surface and covering the lottery game indicia with one or more clear protective layers;
printing onto the front surface of the clear protective layer an opaque material covering the lottery game indicia which is removable by a player to expose the game indicia for playing the game;
wherein the translucent polymer enables viewing through said translucent polymer material by the player;
providing a second support material carrying additional game indicia of the lottery game to be viewed through said translucent polymer material;
viewing the additional game indicia on the second support material through the translucent polymer material of the lottery;
and playing a game related to the lottery ticket using the additional game indicia on the second support material.

2. The method according to claim 1 including playing the game by combining the additional game indicia on the second support material with the game indicia on the lottery ticket.

3. The method according to claim 1 wherein the support material comprises a second lottery ticket.

4. The method according to claim 1 wherein the translucent portion is colored.

5. The method according to claim 1 wherein the translucent polymer material is arranged to have the following characteristics:

| | |
|---|---|
| Melting Point | ≥150 C. ° |
| Softening Point | ≥110 C. ° |
| Shrinkage | ≤3% (30 min at 150 C. °) |
| Surface Energy | ≥39 Dyne/cm |
| Optical Transmission | ≥80% (400 to 700 nm) |
| Tensile Strength | ≥20 Kg/mm$^2$ |
| Tear Strength | ≥20 g/Mil |
| Caliper | 25-500 micron | and preventing observation by an intruder of any ink material from the lottery game indicia which has migrated from above the white lilypad to the translucent polymer material by printing onto a rear surface of the translucent polymer material at a position aligned with the opaque lilypad a coating which is arranged to absorb or reflect any electromagnetic energy applied thereto.

6. The method according to claim 5 wherein the translucent polymer material is arranged to have the characteristic of a surface energy greater than 39 Dyne/cm by applying to the translucent polymer material an acrylic emulsion.

7. The method according to claim 6 wherein the acrylic emulsion is applied to both front and rear surfaces of the translucent polymer material.

8. The method according to claim 5 wherein the translucent polymer material is arranged to have the characteristic of a surface energy greater than 39 Dyne/cm by treating the front and rear surfaces of the translucent polymer material with a plasma treatment.

9. The method according to claim 5 wherein the translucent polymer material has a fold endurance of ≥103 cycles.

10. The method according to claim 5 wherein the translucent polymer material is arranged to have the following characteristics

| | | |
|---|---|---|
| Melting Point | 150 to 290 | C. ° |
| Softening Point | 110 to 260 | C. ° |
| Shrinkage | 1 to 3% | (30 min at 150 C. °) |
| Surface Energy | 39 to 50 | Dyne/cm |
| Optical Transmission | ≥80% | (400 to 700 nm) |
| Tensile Strength | ≥20 | Kg/mm$^2$ |
| Tear Strength | ≥20 | g/Mil |
| Caliper | 25 to 500 | micron |

11. The method according to claim 1 wherein the translucent polymer material is PET.

12. The method according to claim 1 wherein the translucent polymer material is colored.

13. The method according to claim 1 wherein the whole of the lottery ticket is formed by said translucent polymer material so that the game indicia and the covering is printed on the said translucent polymer material.

14. The method according to claim 1 wherein a part only of the lottery ticket is formed by said translucent polymer material.

15. The method according to claim 1 wherein the translucent polymer material is laminated to another material and a part of the other material is omitted or removed to expose the synthetic plastics material.

16. The method according to claim 15 wherein the part removed forms a window in the ticket.

* * * * *